(12) United States Patent
Wang et al.

(10) Patent No.: US 11,361,081 B2
(45) Date of Patent: Jun. 14, 2022

(54) SECURE BOOT METHOD FOR TERMINAL DEVICE, TERMINAL DEVICE AND MEDIUM

(71) Applicant: HANGZHOU VANGO TECHNOLOGIES, INC., Hangzhou (CN)

(72) Inventors: Yuan-Lung Wang, Hangzhou (CN); Nick Nianxiong Tan, Hangzhou (CN)

(73) Assignee: HANGZHOU VANGO TECHNOLOGIES, INC., Hangzhou (CN)

( * ) Notice: Subject to any disclaimer, the term of this patent is extended or adjusted under 35 U.S.C. 154(b) by 0 days.

(21) Appl. No.: 17/365,988

(22) Filed: Jul. 1, 2021

(65) Prior Publication Data
US 2021/0334383 A1 Oct. 28, 2021

(30) Foreign Application Priority Data

Jan. 26, 2021 (CN) .......................... 202110101116.4

(51) Int. Cl.
G06F 21/57 (2013.01)
G06F 9/4401 (2018.01)
(52) U.S. Cl.
CPC .......... G06F 21/575 (2013.01); G06F 9/4401 (2013.01); G06F 2221/034 (2013.01)

(58) Field of Classification Search
CPC ................ G06F 21/575; G06F 9/4401; G06F 2221/034; G06F 9/44505; G06F 21/57; G06F 21/78
See application file for complete search history.

(56) References Cited

U.S. PATENT DOCUMENTS

| 9,367,515 | B1 * | 6/2016 | Myers | G06F 11/0757 |
| 2008/0082814 | A1 * | 4/2008 | Kuo | G06F 9/4403 713/2 |
| 2016/0132340 | A1 * | 5/2016 | Kuncoro | G06F 9/4401 713/2 |
| 2021/0319110 | A1 * | 10/2021 | Edery | G06F 12/1081 |

* cited by examiner

Primary Examiner — Mohammad W Reza
(74) Attorney, Agent, or Firm — JCIP Global Inc.

(57) ABSTRACT

The invention discloses a secure boot method for a terminal device, a terminal device and a medium, relates to the technical field of secure boot, and is used for solving a problem of low system boot security caused by lack of protection for system boot in the related art. The terminal device includes a first processor, a second processor and a shared memory. The method includes: acquiring, by the first processor, an SPL image file; acquiring, by the first processor and the second processor, a third duration and starting timing synchronously; in a case that the third duration expires, transmitting, by the first processor, the SPL image file to the second processor via the shared memory; and booting, by the first processor and/or the second processor, a system of the terminal device cooperatively based on the SPL image file received by the second processor.

13 Claims, 4 Drawing Sheets

SECURE BOOT METHOD FOR TERMINAL DEVICE, TERMINAL DEVICE AND MEDIUM

CROSS-REFERENCE TO RELATED APPLICATION

This application claims the priority benefit of China application serial no. 202110101116.4, filed on Jan. 26, 2021. The entirety of the above-mentioned patent application is hereby incorporated by reference herein and made a part of this specification.

BACKGROUND

Technical Field

The present invention relates to the technical field of secure boot, and particularly, to a secure boot method for a terminal device, a terminal device and a medium.

Description of Related Art

Terminal devices have been widely used in people's daily life. While people enjoy the great convenience that the terminal devices bring to us, security has become an important issue, and even an important consideration for people to purchase related products.

In the related art, most of studies on the security focus on a system operation level, that is, how to find and kill viruses and resist attacks after the terminal device is booted. However, there are rare protection studies on system boot, which also leads to high risks of abnormal system boot and abnormal system operation.

At present, there is no effective solution to the problem of low system boot security caused by lack of protection in the related art.

SUMMARY

To overcome the shortcomings of the related art, the present invention aims at providing a secure boot method for a terminal device, a terminal device and a medium, which builds a secure connection from the first processor to the second processor, thereby providing a secure environment for system boot to improve a system boot security.

A first objective of the present invention is realized by adopting the following technical solutions.

A secure boot method for a terminal device, wherein the terminal device includes a first processor, a second processor and a shared memory, and the method includes: acquiring, by the first processor, a secondary program loader (SPL) image file; acquiring, by the first processor and the second processor, a third duration and starting timing synchronously; in a case that the third duration expires, transmitting, by the first processor, the SPL image file to the second processor via the shared memory; and booting, by the first processor and/or the second processor, a system of the terminal device cooperatively based on the SPL image file received by the second processor.

In some embodiments, before acquiring, by the first processor, the SPL image file, the method further includes: acquiring, by the second processor, a second image file, wherein the second image file is generated after compilation based on a code of the second processor; acquiring, by the first processor and the second processor, a second duration and starting timing synchronously; in a case that the second duration expires, transmitting, by the second processor, the second image file to the first processor via the shared memory; and operating, by the second processor, cooperatively based on the second image file received by the first processor.

In some embodiments, the terminal device further includes a decryption hardware, and the method further includes: decrypting, by the second processor, the received SPL image file by using the decryption hardware to obtain third decryption information; and acquiring, by the second processor, third authentication information and determining whether the third decryption information is correct based on the third authentication information; if yes, allowing to boot the system of the terminal device; if not, prohibiting the system of the terminal device from booting.

In some embodiments, the method further includes: decrypting, by the first processor, the received second image file by using the decryption hardware to obtain second decryption information; and acquiring, by the first processor, second authentication information and determining whether the second decryption information is correct based on the second authentication information; if yes, allowing the second processor to operate cooperatively; if not, prohibiting the second processor from operating cooperatively.

In some embodiments, any image file is acquired by the processor from the shared memory, and the method further includes: determining whether a security of the first processor is higher than that of the second processor, if yes, loading, by the first processor, the image file and storing the image file in the shared memory; if not, loading, by the second processor, the image file and storing the image file in the shared memory.

In some embodiments, the terminal device further includes a management hardware; and starting timing synchronously by the first processor and the second processor includes: utilizing, by the first processor, an inter-processor communication (IPC) signal generated by the management hardware and starting timing; and sending, by the first processor, the IPC signal to the second processor, and starting timing, by the second processor, in response to the IPC signal.

In some embodiments, the terminal device further includes disposable storage hardware, and the third duration is stored in the disposable storage hardware.

In some embodiments, an efficiency of the first processor is higher than that of the second processor, and a timeliness of the first processor is lower than that of the second processor.

A second objective of the present invention aims at providing a terminal device that executes the first objective of the present invention, wherein the terminal device includes a processing unit and a storing device, the processing unit includes a first processor and a second processor, a computer program is stored in the storing device, and the processing unit is configured to implement the method above when executing the computer program.

A third objective of the present invention aims at providing a computer-readable storage medium for storing the first objective of the present invention, with a computer program stored thereon, wherein the computer program, when executed by a processor, implements the method above.

Compared with the related art, the present invention has the beneficial effects that: the first processor orderly transmits data of the SPL image file to the shared memory in the case that the third duration expires, while the second processor orderly receives the data of the SPL image file from the shared memory in the case that the third duration expires, thereby building a secure connection from the first processor to the second processor. If the first processor or the second processor is abnormal, the SPL image file received by the second processor is stored incorrectly, and accordingly, the system of the terminal device cannot be booted. In other words, the present invention provides a secure environment for the system boot to protect the system boot.

BRIEF DESCRIPTION OF THE DRAWINGS

The accompanying drawings illustrated herein serve to provide a further understanding of the present application and constitute a part of the present application, and the illustrative embodiments of the present application and together with the description thereof serve to explain the present application, and do not constitute inappropriate limitation to the present application. In the drawings.

DESCRIPTION OF THE EMBODIMENTS

To make the objectives, technical solutions, and advantages of the present application clearer, the following describes and illustrates the present application with reference to the accompanying drawings and embodiments. It should be understood that the specific embodiments described herein are merely illustrative of the present application and are not intended to limit the present application. Based on the embodiments provided by the present application, all other embodiments obtained by those of ordinary skills in the art without going through any creative effort shall fall within the scope of protection of the present application.

It is understandable that although the efforts made in the development process may be complicated and lengthy, for those of ordinary skills in the art related to the contents disclosed in the present application, some changes in design, manufacture or production based on the technical contents disclosed in the present application are only conventional technical means, and should not be understood as the contents disclosed in the present application are insufficient.

First Embodiment

The first embodiment provides a secure boot method for a terminal device, which aims at solving a problem of low system boot security caused by lack of system boot protection in the related art.

Figure 1:
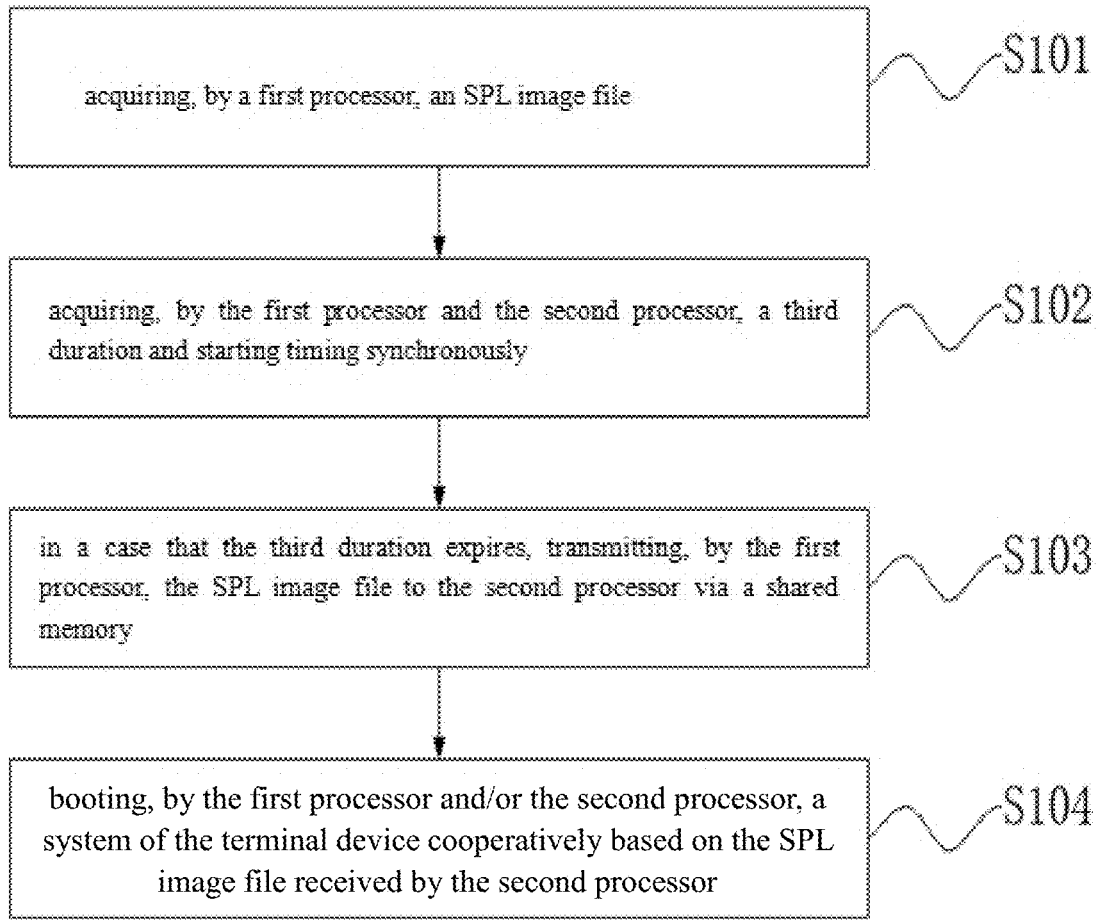
FIG. 1 is a flow chart of a secure boot method for a terminal device as shown in an embodiment of the present application.
Figure 3:
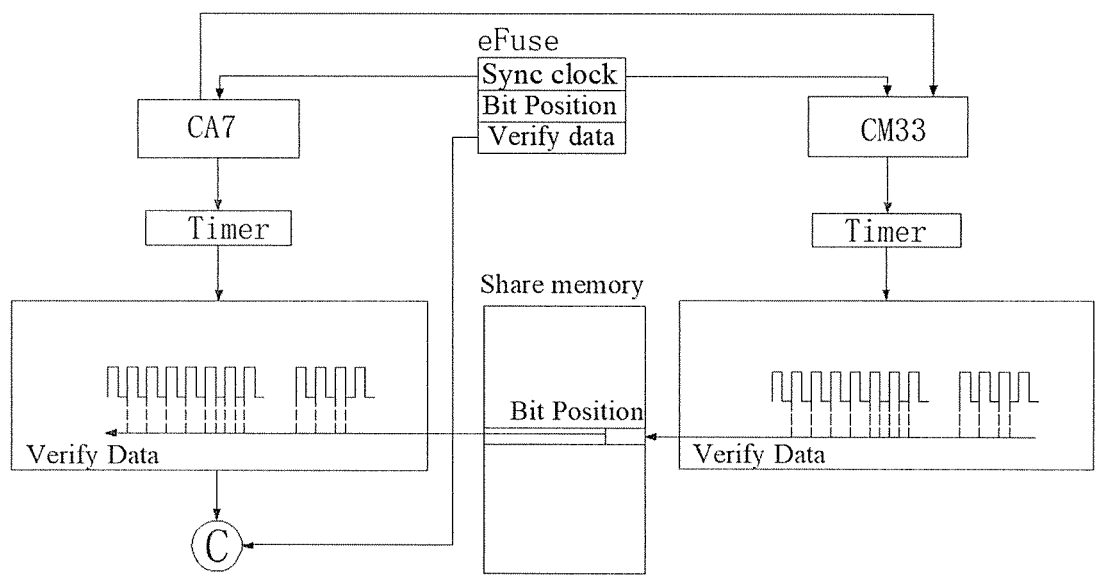
FIG. 3 is a schematic diagram showing a principle of building a secure connection from a first processor to a second processor as shown in the embodiment of the present application.

FIG. 1 is a flow chart of the secure boot method for the terminal device as shown in the embodiment of the present application. FIG. 3 is a schematic diagram showing a principle of building a secure connection from a first processor to a second processor according to the embodiment of the present application. Referring to FIG. 1 and FIG. 3, the method includes step S101 to step S104.

In step S101, a first processor acquires an SPL image file. Here, it is worth noting that the SPL is a code executed in a previous stage of U-Boot (Universal Boot Loader). Accordingly, a system of the terminal device needs to be booted based on the SPL image file, and the way in which the first processor acquires the SPL image file is not limited here.

In step S102, the first processor and the second processor acquire a third duration and start timing synchronously. Here, taking the first processor as an example, after acquiring the third duration, the first processor enters a timing state, and a timing start time is recorded as t1, a timing end time is recorded as t2, and the third duration is recorded as T, then T=t2−t1.

In step S103, in a case that the third duration expires, the first processor transmits the SPL image file to the second processor via the shared memory. The shared memory may be a general static random access memory (SRAM), used for storing information under a multi-core architecture.

It can be understood that the time when the third duration expires is the timing end time t2. Here, a mode of transmitting the image files by using the duration and the shared memory is regarded as a synchronous virtual serial transmission mode. For example, the first processor orderly transmits data of the SPL image file to the shared memory in the case that the third duration expires, while the second processor orderly receives the data of the SPL image file from the shared memory in the case that the third duration expires, thereby building a secure connection from the first processor to the second processor.

In step S104, the first processor and/or the second processor boot a system of the terminal device cooperatively based on the SPL image file received by the second processor.

In conclusion, the secure connection from the first processor to the second processor is built between the first processor and the second processor through the synchronous virtual serial transmission mode. If the first processor or the second processor is abnormal, the SPL image file received by the second processor is wrong, and accordingly, the system of the terminal device cannot be booted. In other words, the present invention provides a secure environment for the system boot to realize the system boot protection.

It is to be understood that the steps shown in the flow above or the flow chart of the accompanying drawings may be executed in a computer system such as a set of computer-executable instructions, and, although a logical sequence is shown in the flow chart, in some cases, the steps shown or described may be executed in a sequence different from the sequence herein.

As an optional embodiment, the terminal device may further include a disposable storage hardware (i.e., eFuse), wherein the third duration is stored in the disposable storage hardware. Accordingly, both the first processor and the second processor acquire the third duration from the disposable storage hardware.

As an optional embodiment, the first processor may be provided with a timing function or an external timer to realize timing. Certainly, it is preferable to adopt the setting of the external timer (i.e., Timer), so the first processor and the second processor can be connected with the timer respectively. Here, taking the first processor as an example, the first processor may read the third duration from the disposable storage hardware, and then send the duration to the timer. The timer starts timing at a corresponding time and notifies the first processor after the third time expires. Accordingly, since both the first processor and the second processor use the timer to start timing synchronously, the timing can be ended synchronously in the same third duration. Therefore, when one of the first processor and the second processor enters a transmitting mode, the other processor may enter a receiving mode synchronously.

As an optional embodiment, an efficiency of the first processor is higher than that of the second processor, and a timeliness of the first processor is lower than that of the second processor. That is, corresponding programs in the system may select the corresponding processor according to the efficiency and the timeliness, so as to reduce pressures on the two processors and realize the orderly progress of the programs.

In the technical solution, the SPL image file is transmitted to the second processor through the synchronous virtual serial transmission mode, that is, the secure connection is from the first processor to the second processor, which is dominated by the first processor, i.e., adapted to the setting that the first processor is the primary processor. A CA7 chip is preferably used as the first processor, and a CM33 chip is preferably used as the second processor.

Second Embodiment

Figure 2:
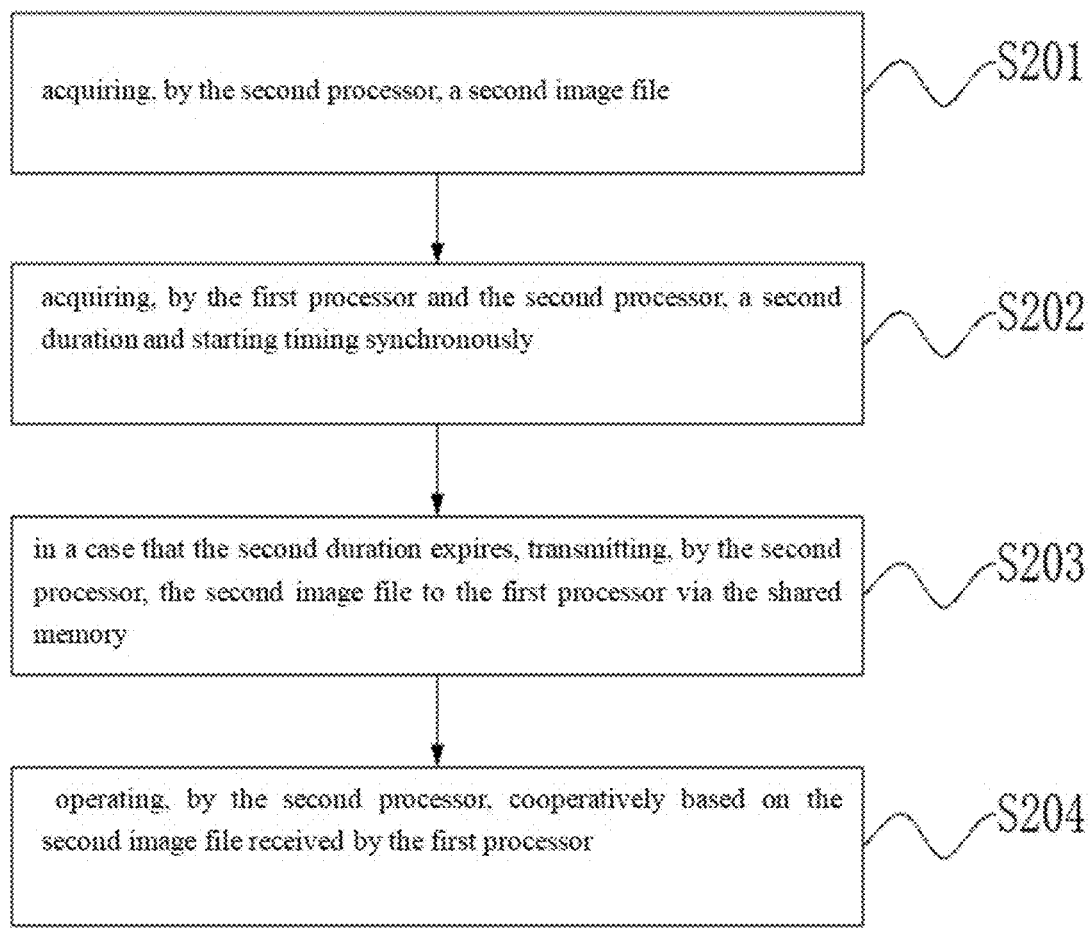
FIG. 2 is a flow chart of a second image file processing step as shown in an embodiment of the present application.
Figure 4:
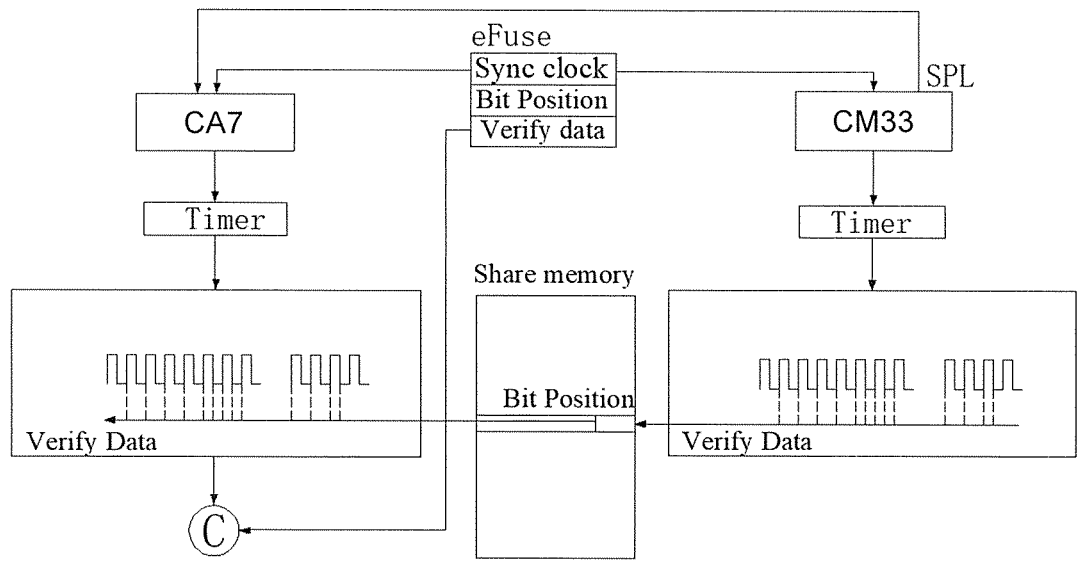
FIG. 4 is a schematic diagram showing a principle of building a secure connection from a second processor to a first processor as shown in an embodiment of the present application.

The second embodiment provides a secure boot method for a terminal device. The second embodiment is carried out on the basis of the first embodiment. The method may also include a second image file processing step. FIG. 2 is a flow chart of the second image file processing step as shown in the embodiment of the present application. FIG. 4 is a schematic diagram showing a principle of building a secure connection from the second processor to the first processor according to the embodiment of the present application.

The second image file processing step is executed before step S101, which may be specifically shown in FIG. 3 and FIG. 4. The second image file processing step may include step S201 to step S204.

In step S201, the second processor acquires a second image file, wherein the second image file is generated after compilation based on a code of the second processor, that is, some programs of the second processor when running need to be based on the second image file, for example, the related steps in step S101 to step S104. A way of acquiring the second image file is not limited here.

In step S202, the first processor and the second processor acquire a second duration and start timing synchronously. The second duration is preferably stored in the disposable storage hardware, and the related description of step S202 may refer to step S102. It is to be understood that in order to ensure the normal operation of the second processor, the second processor is rebooted before the synchronous virtual serial transmission mode is performed in the second image file processing step.

In step S203, in a case that the second duration expires, the second processor transmits the second image file to the first processor via the shared memory. That is, the second processor transmits the second image file to the first processor through the synchronous virtual serial transmission mode. Specifically, the second processor orderly transmits data of the second image file to the shared content in the case that the second duration expires, while the first processor orderly receives the data of the second image file from the shared memory in the case that the second duration expires, thus building a secure connection from the first processor to the second processor.

In step S204, the second processor operates cooperatively based on the second image file received by the first processor. Here, it is worth noting that if any of the first processor and the second processor is abnormal, the second image file received by the first processor is abnormal, and steps S101 to S104 cannot be successfully completed, thus limiting the system boot.

With this technical solution, the secure connection from the second processor to the first processor can be built. Combined with the first embodiment above, this technical solution can realize the bidirectional secure connection between the first processor and the second processor, thus better improving the environmental security for the system boot.

Further, the method may further include a first image file processing step, and the first image file processing step is executed before step S101. The first image file is generated after compilation based on a code of the first processor, that is, some programs of the first processor when running need to be based on the first image file, for example, the related steps in step S101 to step S104.

Specifically, the first image file processing step may include: acquiring, by the first processor, the first image file; transmitting, by the first processor, the first image file to the second processor through a synchronous virtual serial transmission mode; and operating, by the first processor, cooperatively based on the second image file received by the first processor. Accordingly, a first duration needed by the synchronous virtual serial transmission mode is also stored in the disposable storage hardware.

With this technical solution, before performing step S101, the bidirectional secure connection can be built before step S101 through the first image file processing step and the second image file processing step. However, to avoid a compatibility problem between the SPL image file and the environment, it is necessary to transmit the SPL image file from the first processor to the second processor to improve the security. However, the secure connection built by the SPL image file through the synchronous virtual serial transmission mode overlaps with the security connection built by the first image file through the synchronous virtual serial transmission mode, so the first image file processing step may be omitted.

As an optional embodiment, the method may further include: determining whether a security of the first processor is higher than that of the second processor, if yes, loading, by the first processor, the image file and storing the image file in the shared memory; if not, loading, by the second processor, the image file and storing the image file in the shared memory.

It can be understood that any image file is subjected to security authentication when loading data from an external memory, while security authentication standards of each processor are different. Therefore, in this technical solution, the processor with higher security is used to load the corresponding image file from the external memory to better authenticate the security of the image file.

Here, it is worth noting that, in combination with the above-mentioned embodiment that the efficiency of the first processor is higher than that of the second processor, the first processor is the primary processor, and the security authentication level is higher than that of the second processor that serves as the secondary processor. The image file is loaded by the first processor and stored in the shared memory, and the image file is not limited to the SPL image file, the first image file and a third image file. Accordingly, to avoid transmission errors, the first processor in step S101 acquires the SPL image file from the shared memory, or the second processor in step S201 acquires the second image file from the shared memory, and then deletes the image file stored in the shared memory. Accordingly, the image file received by the first processor or the second processor via the synchronous virtual serial transmission mode is stored in the shared memory, so that the corresponding image file in the shared memory is unique, thus avoiding acquisition errors.

As an optional embodiment, the terminal device may also include management hardware. The management hardware (i.e., IPC & Semaphore) refers to hardware for synchronizing and managing common resources. Starting timing synchronously by the first processor and the second processor may include: utilizing, by the first processor, an IPC signal generated by the management hardware and starting timing; and sending, by the first processor, the IPC signal to the second processor, and starting timing, by the second processor, in response to the IPC signal. This step is applicable to step S102 and step S202, or the like.

It can be understood that the IPC signal transmission is extremely fast, so the first processor and the second processor may be regarded as starting timing synchronously. After the same duration expires, it is regarded that the synchronous timing is ended.

Third Embodiment

The third embodiment provides a secure boot method for a terminal device. The third embodiment is carried out on the basis of the first embodiment and/or the second embodiment.

The method may also include an SPL image file decrypting step. Accordingly, the terminal device includes decryption hardware (i.e., secure hash algorithm (SHA)). Specifically, as shown in FIG. 2, the SPL decrypting step is executed after step S103 and before step S104. The SPL decrypting step includes the following.

The second processor decrypts the received SPL image file by using the decryption hardware to obtain third decryption information; and acquiring, by the second processor, third authentication information and determining whether the third decryption information is correct based on the third authentication information; if yes, allowing to execute step S104, i.e., allowing to boot the system of the terminal device; if not, prohibiting to execute step S104, i.e., prohibiting the system of the terminal device from booting. The decrypting method may be realized by using the existing hash function, and is not limited here. Here, it is worth noting that the third authentication information is preferably stored in the disposable storage hardware.

The validity and the correctness of the SPL image file can be authenticated through the SPL image file decrypting step, so that the system boot security is improved on the basis of ensuring the security environment for system boot.

As an optional embodiment, on the basis of the second image file processing step, the method may also include a second image file decrypting step. As shown in FIG. 3 and FIG. 4, the second image file processing step is executed after step S203 and before step S204. The method may also include the following.

The first processor decrypts the received second image file by using the decryption hardware to obtain second decryption information; and the first processor acquires second authentication information and determining whether the second decryption information is correct based on the second authentication information; if yes, allowing to step S204, i.e., the second processor is allowed to operate cooperatively; if not, step S204 is prohibited to execute, i.e., the second processor is prohibited to execute from operating cooperatively. The decrypting method is not limited here, and the second authentication information is preferably stored in the disposable storage hardware.

The validity and the correctness of the second image file can be authenticated through the second image file decrypting step, so that the system boot security is further improved on the basis of ensuring the security environment for system boot.

As an optional embodiment, on the basis of the first image file processing step, the method may also include a first image file decrypting step to decrypt the first image file received by the second processor. Please refer to the related descriptions of the SPL image file decrypting step and the second image file decrypting step for details, which will not be elaborated here.

Fourth Embodiment

Figure 5:
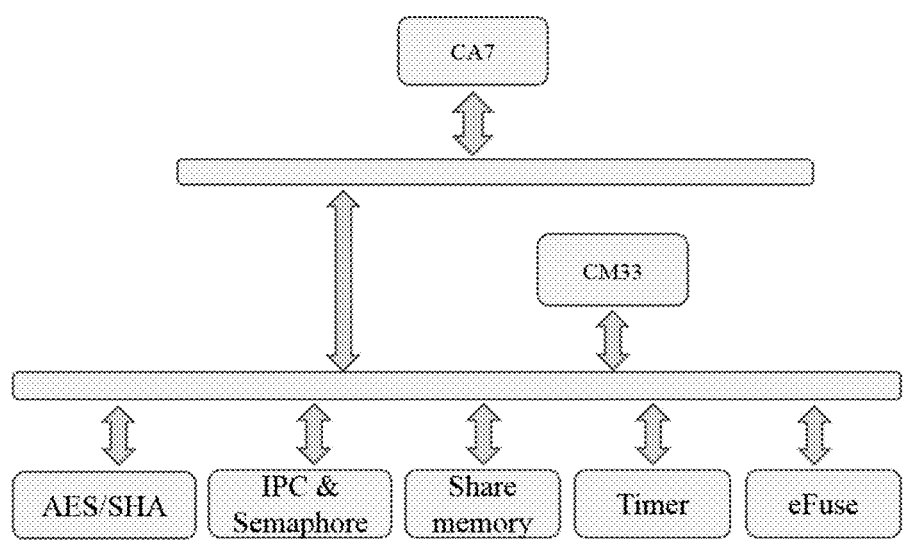
FIG. 5 is a schematic structural diagram of the terminal device as shown in an embodiment of the present application.

The fourth embodiment provides a terminal device. FIG. 5 is a schematic structural diagram of the terminal device as shown in the fourth embodiment of the present application, wherein the CA7 chip is a first processor, and the CM33 chip is a second processor. FIG. 5 is only for illustration, and does not specifically limit the first processor and the second processor.

As shown in FIG. 5, the terminal device includes a processing unit and a storing device. The storing device includes a shared memory. The processing unit includes the first processor and the second processor.

A computer program is stored in the storing device, and the processing unit is configured to run the computer program to implement any one of the secure boot method for the terminal device in the above embodiments. For specific examples, please refer to the examples described in the above embodiments and optional embodiments, which will not be elaborated here in this embodiment.

Further, the storing device may also include a disposable storage hardware (i.e. eFuse). The terminal device may also include a decryption hardware (i.e., SHA), a management hardware (i.e., IPC & Semaphore), a timer (i.e., Timer), or the like. For details, please refer to the relevant descriptions of the first embodiment and the second embodiment mentioned above, which will not be elaborated here.

Optionally, the terminal device above may also include a transmission device and an input/output device, wherein the transmission device is connected with the processing unit above, and the input/output device is connected with the processing unit above.

In addition, in combination with the secure boot method for the terminal device in the above embodiments, the fourth embodiment 4 the present application may be implemented by providing a storage medium. A computer program is stored on the storage medium. When executed by a processor, the computer program implements any one of the secure boot method for the terminal device in the above embodiments, wherein the processing unit includes a first processor and a second processor, and the terminal device includes a first processor, a second processor and a shared memory. The method includes: acquiring, by the first processor, an SPL image file; acquiring, by the first processor and the second processor, a third duration and starting timing synchronously; in a case that the third duration expires, transmitting, by the first processor, the SPL image file to the second processor via the shared memory; and cooperating, by the first processor and/or the second processor to boot a system of the terminal device based on the SPL image file received by the second processor.

As shown in FIG. 5, taking a processing unit as an example, the processing unit, a storing device, an input device and an output device in the terminal device may be connected by bus or other means, and the connection by bus is taken as an example in FIG. 5.

As a computer-readable storage medium, the storing device may include a high-speed random access storing device, a nonvolatile storing device, and the like, and may be used to store operating systems, software programs, computer executable programs and databases, such as program instructions/modules corresponding to the secure boot method for the terminal device according to the first embodiment of the present invention. In some examples, the storing device may further include storing devices remotely located with respect to the processing unit, and these remote storing devices may be connected to the terminal device through a network.

The processing unit is used for providing calculating and controlling abilities, may include a central processing unit (CPU), or an application specific integrated circuit (ASIC), or may be configured to implement one or more integrated circuits of the embodiments of the present application. The processing unit runs the computer executable programs, software programs, instructions, and modules stored in the storing device, thus performing functional applications and data processing of the terminal device for implementing the secure boot method for the terminal device according to the first embodiment.

An output device of the terminal device may be a liquid crystal display or an electronic ink display, and an input device of the terminal device may be a touch layer covered on the display, or a key, a trackball or a touchpad arranged on a shell of the computer device, and may also be an external keyboard, an external touchpad or an external mouse, or the like.

The terminal device may further include a network interface/communication interface, and the network interface of the terminal device is used to connect and communicate with an external terminal through a network. Examples of the networks above include, but are not limited to, the Internet, intranet, local area networks, mobile communication networks, and combinations thereof.

Those skilled in the art can understand that the structure shown in FIG. 5 is only a block diagram of some structures related to the solutions of the present application and does not constitute a limitation on the terminal device to which the solutions of the present application is applied. The terminal device may include more or fewer components than those shown in the figure, or may combine some components, or have different component arrangements.

It is worth noting that, in the embodiment of the secure boot method for the terminal device, each unit and each module included are only divided according to a functional logic, but are not limited to the above division, as long as the corresponding functions can be realized. In addition, the specific names of the functional units are only for the convenience of distinguishing each other, and are not used to limit the protection scope of the present invention.

Unless otherwise defined, the technical terms or scientific terms involved in the present application should have general meanings understood by those of ordinary skills in the technical field to which the present application belongs. Similar words such as "one", "a", "an" and "the" used in the present application do not mean quantity limitation, but may mean singular or plural. The term "comprise", "include" and "provided with" and any variations thereof involved in the present application are intended to cover non-exclusive inclusion. "Connection", "connected", "couple" and similar terms involved in the present application are not limited to a physical or mechanical connection, but may include an electrical connection, regardless of a direct or indirect connection. "A plurality" involved in the present application means two or more. "And/or" describes an association relationship of associated objects, indicating that there may be three relationships. The character "/" generally indicates that the contextual objects are of an "or" relationship. The terms "first", "second", "third" and the like involved in the present application are used to distinguish similar objects only, and do not represent specific ordering for objects.

The above embodiments merely express several embodiments of the present application, and the descriptions thereof are more specific and detailed, but cannot be understood as a limitation to the scope of the invention patent. It should be noted that those of ordinary skills in the art may make a plurality of decorations and improvements without departing from the conception of the present application, and these decorations and improvements shall all fall within the protection scope of the present application. Therefore, the protection scope of the patent of the present application should be subjected to the claims appended.

What is claimed is:

1. A secure boot method for a terminal device, wherein the terminal device comprises a first processor, a second processor and a shared memory, and the method comprises:
   acquiring, by the first processor, a secondary program loader (SPL) image file, wherein the SPL image file is executed in a previous stage of a universal boot loader (U-Boot);
   acquiring, by the first processor and the second processor, a preset duration and starting timing synchronously;
   orderly transmitting, by the first processor, the SPL image file to the shared memory in a case that the preset duration expires, while orderly receiving, by the second processor, the SPL image file from the shared memory in the case that the preset duration expires; and
   booting, by at least one of the first processor and the second processor, a system of the terminal device cooperatively based on the SPL image file received by the second processor.

2. The method according to claim 1, wherein before acquiring, by the first processor, the SPL image file, the method further comprises:
   acquiring, by the second processor, a second image file, wherein the second image file is generated after compilation based on a code of the second processor;
   acquiring, by the first processor and the second processor, another preset duration and starting timing synchronously;
   in a case that the another preset duration expires, transmitting, by the second processor, the second image file to the first processor via the shared memory; and
   operating, by the second processor, cooperatively based on the second image file received by the first processor.

3. The method according to claim 2, wherein the terminal device further comprises a decryption hardware, and the method further comprises:
   decrypting, by the second processor, the received SPL image file by using the decryption hardware to obtain third decryption information; and
   acquiring, by the second processor, third authentication information and determining whether the third decryption information is correct based on the third authentication information; if yes, allowing to boot the system of the terminal device; if not, prohibiting the system of the terminal device from booting.

4. The method according to claim 3, wherein the method further comprises:
  decrypting, by the first processor, the received second image file by using the decryption hardware to obtain second decryption information; and
  acquiring, by the first processor, second authentication information and determining whether the second decryption information is correct based on the second authentication information; if yes, allowing the second processor to operate cooperatively; if not, prohibiting the second processor from operating cooperatively.

5. The method according to claim 1, wherein any image file is acquired by the processor from the shared memory, and the method further comprises:
  determining whether a security of the first processor is higher than that of the second processor, if yes, loading, by the first processor, the image file and storing the image file in the shared memory; if not, loading, by the second processor, the image file and storing the image file in the shared memory.

6. The method according to claim 2, wherein any image file is acquired by the processor from the shared memory, and the method further comprises:
  determining whether a security of the first processor is higher than that of the second processor, if yes, loading, by the first processor, the image file and storing the image file in the shared memory; if not, loading, by the second processor, the image file and storing the image file in the shared memory.

7. The method according to claim 3, wherein any image file is acquired by the processor from the shared memory, and the method further comprises:
  determining whether a security of the first processor is higher than that of the second processor, if yes, loading, by the first processor, the image file and storing the image file in the shared memory; if not, loading, by the second processor, the image file and storing the image file in the shared memory.

8. The method according to claim 4, wherein any image file is acquired by the processor from the shared memory, and the method further comprises:
  determining whether a security of the first processor is higher than that of the second processor, if yes, loading, by the first processor, the image file and storing the image file in the shared memory; if not, loading, by the second processor, the image file and storing the image file in the shared memory.

9. The method according to claim 5, wherein the terminal device further comprises a management hardware; and starting timing synchronously by the first processor and the second processor comprises:
  utilizing, by the first processor, an inter-processor communication (IPC) signal generated by the management hardware and starting timing; and
  sending, by the first processor, the IPC signal to the second processor, and starting timing, by the second processor, in response to the IPC signal.

10. The method according to claim 5, wherein the terminal device further comprises a disposable storage hardware, and the preset duration is stored in the disposable storage hardware.

11. The method according to claim 1, wherein an efficiency of the first processor is higher than that of the second processor, and a timeliness of the first processor is lower than that of the second processor.

12. A terminal device, wherein the terminal device comprises a processing unit and a storing device, the processing unit comprises a first processor and a second processor, a computer program is stored in the storing device, and the processing unit is configured to implement the method according to claim 1 when executing the computer program.

13. A non-transitory computer-readable storage medium with a computer program stored thereon, wherein the computer program, when executed by a processor, implements the method according to claim 1.

* * * * *